Patented July 24, 1934

1,967,292

UNITED STATES PATENT OFFICE 1,967,292

PLASTIC COMPOSITION

Louis J. De Holczer, Passaic, N. J., assignor to New York Belting & Packing Company, Passaic, N. J., a corporation of New York No Drawing. Application October 18, 1933, Serial No. 694,111

7 Claims. (Cl. 106—23)

This invention relates to plastic compositions and more particularly to plastic compositions containing chloroprene plastic polymers.

Chloroprene plastic polymers may be produced by the polymerization of chloroprene (chloro-2-butadiene-1,3), as described in the Journal of the American Chemical Society, vol. 53, No. 11, November 1931, pages 4197–4226. The chloroprene

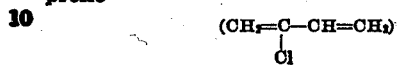

differs structurally from isoprene

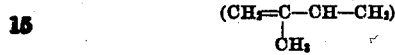

only in having a chlorine atom instead of a methyl group attached to the carbon in the 2-position. Isoprene, as is well known, polymerizes to rubber hydrocarbon and chloroprene spontaneously polymerizes under certain conditions to a substance resembling unvulcanized rubber. If the polymerization is allowed to continue until the stage is reached wherein the product is similar to vulcanized rubber, the material, of course, cannot be satisfactorily milled, compounded, or made into articles similar to rubber articles which have been formed of an unvulcanized rubber and vulcanized subsequent to their formation. Polymerization of the chloroprene may, however, be stopped at the point where a substance resembling unvulcanized rubber is produced, which substance may be compounded with filler materials as in rubber manufacture, shaped as desired into the finished article, and then the polymerization continued as by heating until the material assumes a condition similar to compounded vulcanized rubber. The polymerization of the chloroprene polymer resembling unvulcanized rubber to the polymer resembling vulcanized rubber takes place without the addition of any of the so-called vulcanizing agents, such as sulphur, which are utilized in the vulcanization of natural rubber. Heat alone is sufficient to polymerize the synthetic material, chloroprene, to a state resembling vulcanized rubber. This change in state from the type of polymer resembling unvulcanized rubber to the polymer which resembles vulcanized rubber, is sometimes termed a vulcanization or curing, and various ingredients are known to be advantageous in this curing or so-called vulcanizing operation. Chloroprene plastic polymers have among other properties the valuable property of high resistance to swelling and deterioration by oils.

The desirability of compounding the chloroprene plastic polymer with so-called accelerators, such as rosin, magnesium oxide, sulphur, and zinc oxide to prevent scorching at milling temperatures and to accelerate the cure at higher temperatures and to improve the so-called vulcanizate, is known. Even in adding such accelerators to chloroprene plastic polymers a strict adherence to a specific order of mixing has been found necessary in order to prevent burning on the mill and even with the most careful mixing, scorching on the mill or in storage is likely to occur. In order to produce stocks which are capable of being calendered or tubed, it has been found desirable to compound the chloroprene plastic polymer compositions with certain softeners, such as brown factice, coumaroneresins, cotton seed oil, and the like, but such stocks have not been found wholly satisfactory for certain uses because of the reduced resistance to absorption of oils, particularly hot oils. Various filler materials, commonly used in compounding rubber stocks, for example, whiting, clay, carbon black, red oxide, asbestine, etc., may be used as fillers in compounding chloroprene plastic polymers.

One object of the present invention is to produce chloroprene plastic polymer stocks suitable for the manufacture of gasoline hose, oil hose, and the like, and particularly stocks which are resistant to hot oil up to temperatures of 300° F. and over.

Another object of the invention is to prevent scorching of chloroprene plastic polymers both on the mill, as in compounding of the same, and in storage.

A further object of the invention is to compound chloroprene plastic polymers in such a way that the various accelerators and fillers used to compound the polymer may be mixed in any order and without extreme precautions to prevent scorching.

A still further object of the invention is to produce a compounded chloroprene plastic polymer having improved calendering and tubing qualities.

In carrying out the present invention there is mixed with the chloroprene plastic polymer a plastic, elastic reaction product of one molar proportion of an aromatic compound having the general formula R—$C_6H_4$—R', wherein R and R' each represent hydrogen or a saturated aliphatic hydrocarbon radical containing more than one carbon atom, with about one to three molar proportions of ethylene chloride, which may be prepared as described in the copending application Serial No. 685,739 of Seaphes D. Shinkle. The preparation of this plastic, elastic reaction product is described in detail in the referred to Shinkle application, and there is quoted below sufficient disclosure from that application to aid in preparing the product:

In preparing these new products, one mol of an aromatic compound having the general formula R—C$_6$H$_4$—R', wherein R and R' each represent hydrogen or a saturated aliphatic hydrocarbon radical containing more than one carbon atom, examples of which are benzene, ethyl benzene, diethyl benzene, isopropyl benzene (cumene), butyl benzene is treated with one to three mols of an ethylene dihalide (symmetrical) in the presence of aluminum chloride or its equivalent, and the reaction allowed to proceed until gellation occurs, and thereafter the reaction is stopped and the product recovered. When an aromatic hydrocarbon of the class described is treated with an ethylene dihalide, such as ethylene chloride, in the presence of a small amount of aluminum chloride, a smooth reaction takes place with the evolution of hydrogen chloride during which there is a marked increase in the viscosity of the reaction mixture. When the reaction has proceeded to a certain point, the entire liquid reaction mixture swells to several times its original volume and is converted into a jelly-like mass. The reaction may thereafter be stopped and the product substantially freed from aluminum salts, by treating or washing the mass with water, preferably containing a small amount of acid such as hydrochloric acid or alkali such as sodium hydroxide, and finally with water. In order to facilitate the washing operation, the jelly may be disintegrated by mechanical and/or by other means. I have found that the addition to the reaction mixture just prior to the washing treatment of a small quantity of an organic solvent, such as butylacetate, together with a mechanical disintegration, effects rapidly the breaking up of the gel structure and produces a mass of finely divided jelly-like particles. I may, if desired, pass steam through the mixture during the washing operation, thereby effecting the removal of any unreacted hydrocarbon or ethylene dihalide. The resulting product is a spongy mass of elastic particles, which may be separated from the water and dried. Drying may be effected by heating at an elevated temperature, for example at 70° to 100° C., under vacuum, if desired, thereby removing residual water, volatile hydrocarbon and ethylene dihalide, or the product may first be partially dried by squeezing, as by passing the material repeatedly through the rolls of a rubber mill. When so milled the particles coalesce to form a smooth continuous sheet. When the products are heated in the presence of water as in the washing and steaming operations they become lighter in color; when they are worked on a cold mill the color remains unchanged. When the products are heated substantially in the absence of water as in hot air, or when worked on a hot mill at temperatures below about 200° C., the products become dark in color, but are otherwise unchanged by the heat.

The addition of the plastic, elastic reaction product above described to the chloroprene plastic polymer produces a composition which has improved tubing and calendering qualities and results in a product having a dry, smooth, velvety feel, and which is highly resistant to gasoline and oil absorption. The addition of this plastic, elastic reaction product also prevents scorching of the composition on the mill, as in compounding, or afterwards in storage. Accelerators for the chloroprene elastic polymer and various fillers may be incorporated in the compositions in any order and without special care since the possibility of scorching the product is substantially eliminated. Various softeners, such as brown factice, as commonly used with chloroprene plastic polymer mixtures, may be incorporated in these compositions to produce desired characteristics in the finished material, more especially where resistance to hot oil is not required.

The proportions of the plastic, elastic reaction product above described to the chloroprene plastic polymer are not critical, as little as 8 parts of the plastic, elastic reaction product per 100 parts of the chloroprene plastic polymer, as shown in Example 4 below, being sufficient to produce a composition having improved tubing and other qualities. Larger proportions, for example equal parts of the plastic, elastic reaction product, and the chloroprene plastic polymer, produce eminently desirable stocks for tubing and calendering, and for providing stocks resistant to hot oil and the like. Compositions with as large proportions as 90 to 95 parts of the plastic, elastic reaction product to 10 to 5 parts of the chloroprene plastic polymer have been found to have desirable properties of smooth running in factory operations.

Various examples of compounded chloroprene plastic polymer stocks, with and without the plastic, elastic reaction product above described, are set forth below for purposes of comparison in order to illustrate more particularly the invention, but it is intended that these examples are to be considered merely illustrative and in no way restrictive of the present invention beyond that required by the prior art.

In the various examples below, parts are noted by weight, and for convenience the chloroprene plastic polymer is termed "chloroprene plastic", and the plastic, elastic reaction product above described in the extract from the Shinkle application is termed "Shinkle plastic". Examples 1 to 3 illustrate chloroprene plastic polymer compositions containing accelerators, Examples 1 and 3 also containing a softener, brown factice, and Examples 2 and 3 filler materials. It is customary in the compounding of such stocks to add the zinc oxide last in order to prevent burning on the mill. Example 1, however, set up in a comparatively short time. Example 4 shows a composition similar to Example 3 but containing 5 parts of the "Shinkle plastic" to reduce the tendency of the composition to scorch and to improve the finish of the vulcanized product. Examples 5, 6 and 7 illustrate compositions comprising about equal proportions of the "chloroprene plastic" and the "Shinkle plastic". Compounds such as examples 5 and 6 are preeminently useful for the manufacture of articles which are to be subjected in use to the action of hot oils. Example 5 is more particularly for tubing and calendering while Example 6 is especially adaptable for providing a friction coat on fabrics and the like. For example, hose resistant to hot oil may be built up in known manner, of, for example, the desired number of plies of fabric frictioned with a compound such as Example 6 and with inner and outer covers of a composition such as Example 5. Compounds such as Example 7 are useful for the manufacture of gasoline and oil resistant articles where resistance to such materials at high temperatures is not required. In compounding compositions comprising the "chloroprene plastic" and the "Shinkle plastic", it is preferred to first blend the two plastic materials after which the remaining ingredients may be incorporated in any desired order.

|  | 1 | 2 | 3 | 4 | 5 | 6 | 7 |
|---|---|---|---|---|---|---|---|
| "Chloroprene plastic" | 60 | 60 | 60 | 60 | 30 | 42 | 28 |
| "Shinkle plastic" |  |  |  |  | 5 | 30 | 28 |
| Brown factice |  | 11 |  | 30 | 30 |  |  | 28 |
| Rosin | 3 |  | 3 | 3 | 2.4 |  | 1.4 |
| Pine tar |  |  |  |  |  | 3 |  |
| MgO | 6 | 6 | 10 | 10 | 6 | 10 | 6 |
| Phenyl beta-naphthylamine (stabilizer) | 1 |  | 1.2 | 1.2 |  | .8 | .6 |
| Whiting |  | 138 | 15 | 15 | 80 |  | 15 |
| Red oxide |  |  | 5 |  |  |  |  |
| Carbon |  |  | 35 | 30 | 5 | 2 | 15 |
| Sulphur | 1 |  | 1.2 | 1.2 | .5 | .5 | .6 |
| Zinc oxide | 1 | 3 | 10 | 10 | 6 | 6 | 6 |

The following table gives the results of gasoline and oil absorption tests on the compositions of Examples 2, 3, 4, 5 and 7 above, cured in steam for 60 minutes at 40 pounds per square inch pressure. Other well known curing methods for compositions comprising the "chloroprene plastic", as by curing in air or in molds may, of course, be utilized.

| Example | Gasoline absorption 7 days immersion at room temperature | | Absorption of light lubricating oil during 7 days immersion at various temperatures; by volume (percent) | | | | |
|---|---|---|---|---|---|---|---|
|  | Weight, percent | Volume, percent | Room temperature | 155° F. | 212° F. | 265° F. | 300° F. |
| 2 | 6.7 | 18.7 | 3.9 | 52.1 |  | 87.4 | 103.8 |
| 3 | 16.9 | 36 | 20.3 | 53.6 |  | 62.8 | 91.4 |
| 4 | 16.5 | 35.5 |  | 59.5 |  |  |  |
| 5 | 3.9 | 13.1 | 4.5 | 27.7 | 37.4 |  | 41.3 |
| 7 | 13.7 | 30.4 | 20.8 | 56.7 |  | 47.1 | 60.3 |

As various modifications will occur to those skilled in the art, it is not intended to limit the invention other than as set forth in the appended claims.

Having thus described my invention, what I claim and desire to protect by Letters Patent is:

1. As a new product, a mixture comprising a chloroprene plastic polymer and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

2. As a new product, a mixture comprising a chloroprene plastic polymer, brown factice, and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

3. As a new product, a mixture comprising a chloroprene plastic polymer, accelerators for the curing of said polymer, and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

4. As a new product, a mixture comprising a chloroprene plastic polymer, accelerators for the curing of said polymer, fillers, and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

5. As a new product, a mixture comprising a chloroprene plastic polymer, accelerators for the curing of said polymer, brown factice, and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

6. As a new product, a mixture comprising a chloroprene plastic polymer, accelerators for the curing of said polymer, fillers, brown factice, and a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride.

7. The method of preventing scorching of a chloroprene plastic polymer comprising mixing therewith a plastic, elastic reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride, and thereafter adding other compounding ingredients.

LOUIS J. DE HOLCZER.